US010525340B2

(12) United States Patent
Muramatsu et al.

(10) Patent No.: US 10,525,340 B2
(45) Date of Patent: Jan. 7, 2020

(54) GAME CONSOLE CONTROLLER AND CONTROLLER SYSTEM FOR GAME CONSOLES

(71) Applicant: HORI CO., LTD., Yokohama (JP)

(72) Inventors: Hiroaki Muramatsu, Kanagawa (JP);
Koichiro Amano, Kanagawa (JP);
Yoshinori Konishi, Kanagawa (JP)

(73) Assignee: HORI CO., LTD., Kanagawa (JP)

( * ) Notice: Subject to any disclaimer, the term of this patent is extended or adjusted under 35 U.S.C. 154(b) by 0 days.

(21) Appl. No.: 16/069,151

(22) PCT Filed: Aug. 26, 2016

(86) PCT No.: PCT/JP2016/074949
§ 371 (c)(1),
(2) Date: Jul. 10, 2018

(87) PCT Pub. No.: WO2017/216978
PCT Pub. Date: Dec. 21, 2017

(65) Prior Publication Data
US 2018/0326299 A1 Nov. 15, 2018

(30) Foreign Application Priority Data

Jun. 13, 2016 (JP) ................................. 2016-117302

(51) Int. Cl.
*A63F 13/24* (2014.01)
*A63F 13/22* (2014.01)
*A63F 13/23* (2014.01)

(52) U.S. Cl.
CPC .............. *A63F 13/24* (2014.09); *A63F 13/22* (2014.09); *A63F 13/23* (2014.09)

(58) Field of Classification Search
USPC .......................................................... 463/37
See application file for complete search history.

(56) References Cited

U.S. PATENT DOCUMENTS

2008/0096657 A1* 4/2008 Benoist ................. A63F 13/837
463/36
2008/0300055 A1* 12/2008 Lutnick ............... G07F 17/3209
463/39

(Continued)

FOREIGN PATENT DOCUMENTS

JP 05-83845 U 11/1993

OTHER PUBLICATIONS

"Tartarus Chroma", full color LED left-handed keypad, will be released on Aug. 7, 2015 in Japan. (http://www.4gamer.net/games/023/G002318/20150723087/), 4Gamer.net, published on Jul. 24, 2015, retrieved on Nov. 11, 2016.

(Continued)

*Primary Examiner* — Pierre E Elisca
(74) *Attorney, Agent, or Firm* — PK Patent Law

(57) ABSTRACT

To allow users who usually play games on a personal computer to enter input to game consoles for domestic use without being stressed.
A controller system for game consoles is made up of a game console controller 100 and a mouse 200. The mouse 200 is identical to an ordinary mouse. The game console controller 100 has a structure resembling a part of a keyboard that is used for common personal computers and equipped with at least six keys 120 in a 2-by-3 array. The mouse 200 and the game console controller 100 can be attached to and removed from each other via a cable 210 extending from the mouse 200. The connection between them is an USB connection.

21 Claims, 6 Drawing Sheets

(56) References Cited

U.S. PATENT DOCUMENTS

| | | | |
|---|---|---|---|
| 2010/0016077 A1* | 1/2010 | Longdale | A63F 13/06 463/37 |
| 2016/0195935 A1* | 7/2016 | Cronholm | G06F 3/017 345/156 |
| 2018/0018014 A1* | 1/2018 | Lutnick | G07F 17/3209 |

OTHER PUBLICATIONS

HORI officially releases FPS "keypad and mouse set" for PS4 & PS3. Increased keys and more possibilities for customization enhance utility. (http://www.4gamer.net/games/311/G031119/20150828001/), 4Gamer.net, published on Aug. 29, 2015, retrieved on Sep. 12, 2017.

International Search Report for PCT/JP2016/074949 dated Nov. 22, 2016.

* cited by examiner

GAME CONSOLE CONTROLLER AND CONTROLLER SYSTEM FOR GAME CONSOLES

CROSS-REFERENCE TO RELATED APPLICATIONS

This application is a national stage 35 U.S.C. 371 filing of International Application No. PCT/JP2016/074949, filed on Aug. 26, 2016, which claims priority to Japanese Patent Application No. 2016-117302, filed Jun. 13, 2016. The entire contents of the aforementioned applications are herein expressly incorporated by reference.

TECHNICAL FIELD

The present invention relates to game console controller systems for entering input to game consoles for domestic use, and game console controllers for constituting a game console controller system.

BACKGROUND ART

Video games have been widely distributed for a long time. Users play video games on a certain device (platform). Various platforms have been developed for video games including home game consoles for domestic use, general-purpose personal computers, portable game consoles, mobile phones, Smartphones, and arcade games installed in amusement facilities such as amusement arcades.

Among these platforms, the present application focuses in particular on game consoles for domestic use and general-purpose personal computers which require relatively complicated inputs and for which a relatively large number of similar kinds of game products have been released.

Examples of home game consoles for domestic use include PlayStation 4 (trademark) manufactured and sold by Sony Interactive Entertainment Inc. and Xbox One (trademark) manufactured and sold by Microsoft Japan Co., Ltd. For these game consoles, a dedicated official controller is often bundled or sold as a separate product and users usually play games using an official controller. Although designs for official controllers have widely varied in the past, a dominant design has begun to emerge. This dominant design is a laterally elongated shape which users can hold with both hands. The left side half is equipped with a four-button directional pad that accepts digital inputs and a rod-shaped analog stick for analog inputs that depend on the displacement direction of the stick. The right side half is equipped with four push buttons and another analog stick that is similar to the one just mentioned.

On the other hand, users who play games on a general-purpose personal computer usually enter their inputs by an input device associated with the general-purpose personal computer. This input device is typically a keyboard or a keyboard-mouse combination.

Game users are usually adept at inputting their responses through an input device that they are familiar with, and not good at inputting their responses through an input device that they are unfamiliar. In the latter case, users often become stressed when inputting their responses. This means that users who usually play games on a game console become stressed when inputting their responses through a keyboard or a keyboard-mouse combination when they play games on a general-purpose personal computer. Likewise, users who usually play games on a general-purpose personal computer become stressed when inputting their responses through an official controller when they play games on a game console.

If a user plays games only on a game console or only on a general-purpose personal computer, that user will not experience the input-associated stress described above. However, whether a game that a user desires to play is compatible with the user's familiar platform (e.g., whether the game that the user desires to play is supported by a software product that is sold or supplied via the Internet) depends on the situation of game suppliers. This restriction prevents some users from playing the games they wish to play, which is disadvantageous not only for the users, but also for the software vendors and suppliers who aim to secure more users.

Users can avoid input-associated stress described above when they are well acquainted with entering input using an input device that they do not normally use. However, gaining such mastery imposes a burden on the user, which again disadvantages the user and compromises the profits of software vendors and suppliers in aiming to secure more users.

From this viewpoint, controllers with similar structures to the official controllers for game consoles for domestic use, but which can be connected to general-purpose personal computers have been proposed and sold. Products of this kind have been sold in large numbers from long ago. The configuration of these controllers follows the dominant design of the official controller, allowing users who usually play games on a game console for domestic use to game on the general-purpose personal computer in a similar way to that they input their responses on an official controller for game consoles for domestic use. Such controllers eliminate, from users who usually play games on a game console but who may wish to play on a general-purpose personal computer, input-associated stress due to a keyboard or a keyboard-mouse combination.

Likewise, a controller including a keyboard or a keyboard-mouse combination that can be connected to game consoles for domestic use eliminates, from users who usually play games on a general-purpose personal computer but who may wish to play on a game console, input-associated stress due to an official controller for game consoles. However, fewer products of this type are provided.

In most mainstream controllers with a keyboard or a keyboard-mouse combination that can be connected to conventional game consoles for domestic use, the input can be entered both through the keyboard only and through the keyboard and the mouse of a keyboard-mouse pair. The keyboard and mouse of such controllers are connected via a cable and cannot be separated. The cable conveys the inputs entered through the mouse to the keyboard. Keyboards, on the other hand, are usually connected to a game console via a cable that differs from the aforementioned cable. The data independently entered through the keyboard and the mouse can be supplied from the keyboard to a game console.

SUMMARY

Problems to be Solved

However, the aforementioned controllers with a keyboard-mouse pair that can be connected to game consoles still need to be improved. In such controllers, the keyboard and the mouse are connected to each other in such a manner that replacing just one of them is not possible. However, the user's preferences vary significantly for the mouse, if not the keyboard. As one can observe a wide diversity of products in the general mouse market, the specifications of mice vary by size, shape, sensitivity, response rate, and handedness (left-handed versus right-handed). Users naturally want to use their preferred mouse, and are inevitably stressed if this preference is not met. Stress is exacerbated because the aforementioned controllers are used for game which requires fast and accurate inputs.

However, sometimes it is not possible for users of the controllers for the type described to use a mouse that fits their own preference; in such cases, their stress cannot be prevented.

An object of the present application is to provide techniques with which users who usually play games on a general-purpose personal computer can enter their inputs to a game console for domestic use without experiencing stress.

Means to Solve the Problems

In order to solve the aforementioned problems, the present inventors propose the following inventions.

The invention of the present application is a game console controller constituting, in combination with a mouse used on a mount surface, the mount surface being a substantially horizontal flat surface, a controller system for a game console for a user's entering input into a game console for domestic use, the mouse being configured to be capable of generating point data indicating an amount and direction of movement of the mouse on the mount surface and having output means for outputting the point data.

This game console controller includes a main body capable of being stably placed on the mount surface; at least four keys arranged in such a manner that, as defined in the case where the body is placed on the mount surface, the keys are on a top surface of the body; input can be entered by pressing the key(s) against the body; the keys are arranged in an area where the user can manipulate them with finger (s) of one hand without displacing the entire one hand; and three keys are aligned in a right-to-left direction of the body of the user and one key is disposed on the farther side of the central one of the three keys from the user, as defined in the case where the user is using the game console controller; key data generating means for generating key data, the key data being data of input by the key(s); input means for receiving the point data from the output means; and game console output means for supplying the key data and the point data to the game console; the input means being standardized.

The game console controller of the present application is used in combination with a mouse, and is used together with the mouse on amount surface that is substantially horizontal. The mount surface is, for example, a top surface of a top plate of a table placed in front of the game console used by a user.

The game console controller corresponds to a keyboard of conventional controllers. It has a main body that can be stably placed on the mount surface and is basically used on the mount surface without being moved thereon.

The main body is equipped with a plurality of keys. These keys correspond to the keyboard keys of conventional controllers. The keys are arranged in an area where the user can manipulate them with finger (s) of one hand without displacing the entire one hand. In this configuration, users can manipulate the keys with the finger(s) of one hand, without displacing the hand. Users manipulate the keys with one hand, that is, one of the hands. Accordingly, the keys required for the game console controller are only the keys dispersed over the range of a typical user's hand span. This means that, although the keys of the game console controller correspond to the keyboard keys for general-purpose personal computers, the game console controller has a smaller number of keys than keyboards keys for general-purpose personal computers. This is useful to reduce the overall size of the game console controller to a size smaller than that of typical keyboards. On the other hand, the plurality of keys is at least four keys, i.e., three keys aligned in a right-to-left direction of the body of the user and one key disposed on the farther side of the central one of the three keys from the user, as defined in the case where the user is using the game console controller. This is because four keys are necessary for entering (assigning) the inputs, as many users desire to enter the four inputs (up, down, left, and right) through the keys of a game console controller. In fact, the minimum reasonable unit for installing four keys is a set of six keys arranged in a 2-by-3 array (with 2 rows and 3 columns). Of course, the aforementioned four keys or six keys arranged in a 2-by-3 array will cause no problem for users to manipulate with their fingers of one hand.

The game console controller has the key data generating means for generating key data when an input is made from the key(s). The key data generating means can be a device same to conventional keyboards.

This game console controller has the input means that receives the point data from the output means of the mouse that outputs the point data generated in the mouse, and has the game console output means that supplies the key data generated by the key data generating means and the point data received by the input means to the game console. The game console output means supplies the key data and the point data to the game console. These data may be wired to the game console or may be transmitted to the game console wirelessly by media such as radio waves and light. The game console controller of the present application is used in place of an official controller for game consoles and used for the purpose of entering input to a game console. Official controllers have, as described above, two analog sticks. Since the point data is data indicating the amount and direction of movement, it is convenient to reproduce the input from one of the analog sticks of an official controller. In other words, the point data generated in the mouse that is combined with this game console controller can be the one corresponding to the data from one of the analog sticks provided on the official controller, and it is practical to do so.

The aforementioned input means is standardized. Then, as a matter of course herein, the output means of the mouse is also standardized. Many mice having standardized output means are sold on the market and such mice are available for users at their disposal. Accordingly, users can combine their favorite mice with the game console controller, and thus users who usually play games on a general-purpose personal computer can enter their inputs to a game console for domestic use without experiencing stress.

Game console controllers may be manufactured and sold without a mouse, but they may be manufactured and sold together with a mouse as well as a game console controller. For the latter cases, what is manufactured and sold is a controller system for game consoles for user's entering input to a game console for domestic use, the controller system being constituted by combining a game console controller and a mouse used on the mount surface, the mouse being configured to be capable of generating point data indicating the amount and direction of movement on the mount surface and having output means for outputting the point data. Under circumstances where such controller systems for game consoles are manufactured and sold, users can replace an attached mouse with their favorite mouse if they don't like the attached one.

As described above, the output means of the mouse is standardized, and the input means provided in the game console controller which can be connected thereto is also standardized. The output means and the input means may have any configuration as long as they are standardized and point data can be transmitted from the output means to the input means. For example, the point data can be transmitted from the output means to the input means wirelessly by media such as radio waves and light, or wired to the input means via a cable. When the aforementioned point data is transmitted wirelessly, the input means and the output means may utilize, for example, the Bluetooth™ communication technology or the technology for the wireless USB protocol.

When the point data is wired from the output means to the input means, the output means of the mouse comprises a cable having an output terminal at an end thereof and the input means has an input terminal for receiving the point data from the output terminal. The input terminal may be removably connected to the output terminal. The input terminal and the output terminal which can be attached to and removed from each other allow users to plug their favorite mouse to the game console controller.

As described above, when the game console controller has an input terminal, this input terminal is standardized as described above. For example, the input terminal may support the USB standard. Since the market is full of mice having an output terminal supporting the USB standard, the input terminal of the game console controller supporting the USB standard increases the chance for users to choose their favorite controller.

The aforementioned USB standard includes Type A, Type B, Type C, Mini A, Mini B, Micro A, Micro B, etc. The input terminal may be two or more different standardized terminals. For example, the game console controller may have USB Type A and Type C input terminals.

The plurality of keys may previously be assigned with appropriate input. The plurality of keys can be configured such that users can assign appropriate input in a manner they want.

For example, the at least four keys may include keys to which respective inputs representing up, down, left, and right directions can be assigned. This means that, under the circumstance where the game console controller of the present application is used in place of an official controller for game consoles and used for the purpose of entering input to a game console, the inputs entered through the four-button directional pad for digital input positioned on the left side of the official controller may be assigned to the aforementioned four keys. It is preferable to, but not limited to, make it possible to assign the left, down, and right inputs to the three keys from the left which are aligned in the right-to-left direction of the body of the user, and assign an up input to one key that is disposed on the farther side of the central one of the three keys from the user, as defined in the case where the user is using the game console controller. In such a case, on an appropriate site such as the top surfaces of the keys that are expected to be assigned with the up, down, left, and right inputs, the keys may be labeled with a letter or symbol (such as an arrow symbol facing up, down, left, or right) so that users can visually recognize that the up, down, left, and right inputs are assigned to these keys.

The keys of the game console controller of the present application may be six keys arranged in a 2-by-3 array. In such a case, it is preferable that the left, down, and right inputs are assigned to the three keys from the left in the lower row of the keys in the 2-by-3 array and the up input is assigned to the key at the center of the upper row.

The game console controller of the present application has at least four keys as described above and may have six keys in the 2-by-3 array. It may have a larger number of keys. In such cases, an appropriate number of keys are added around the four or six (2-by-3) keys. The additional keys other than the essential four keys may be assigned with other inputs representing something other than the up, down, left, and right inputs. As described above, the game console controller of the present application is used in place of an official controller for game consoles and used for the purpose of entering input to a game console. The official controller has two analog sticks and four push buttons besides the above. Although input using a key or keys may be inappropriate for analog inputs, it is possible to assign, for example, the inputs accepted by the two analog sticks and the four push buttons to the aforementioned additional keys.

The main body of the game console controller of the present application may have an analog stick (such as a rod-shaped analog stick) through which users enter analog data indicating the directions according the direction in which the analog stick is displaced.

As described above, it is difficult to reproduce, using the keys alone, the analog inputs entered through the analog stick of an official controller for game consoles. On the other hand, the analog inputs entered through one of the two analog sticks of the official controller for game consoles can be reproduced using the inputs through the mouse as described above. Accordingly, the inputs entered through the other analog stick of the official controller which is not the analog stick for which the inputs are reproduced using the mouse can be reproduced using the analog stick located on the main body of the game console controller.

The keys may be disposed, as defined in the case where the user is using the game console controller, on the side farther from the user and the analog stick may be disposed, as defined in the case where the user is using the game console controller, on the side closer to the user and more inwardly than the site where the keys are disposed on the main body, the analog stick being disposed in such a manner that the analog stick projects inwardly, but it is not necessarily so. With this layout of the keys and the analog stick, users can easily manipulate the keys with the four fingers other than the thumb and the analog stick with the thumb.

The main body has any shape as long as it can be mounted stably on the mount surface but, as defined in the case where the user is using the game console controller, a portion of the main body disposed closer to the user than the site where the keys are disposed on the main body may be configured as a convex portion having an upwardly convex shape on which the user can stably rest his or her palm. As a result, users can manipulate the keys with the palm of one hand rest on the convex portion, i.e., with the hand rest stable. When the analog stick as described above is disposed on the main body, the analog stick may be disposed on the inner side of the convex portion of the main body. When the analog stick is disposed on the inner side of the convex portion of the main body, the inner side of the convex portion may be higher than the outer side of the convex portion. This makes it easier to provide a space available for displacing the analog stick and also makes it easier for users to manipulate the analog stick with their thumb.

DETAILED DESCRIPTION

Hereinafter, preferred embodiments of the present invention are described with reference to the drawings.

Figure 1:
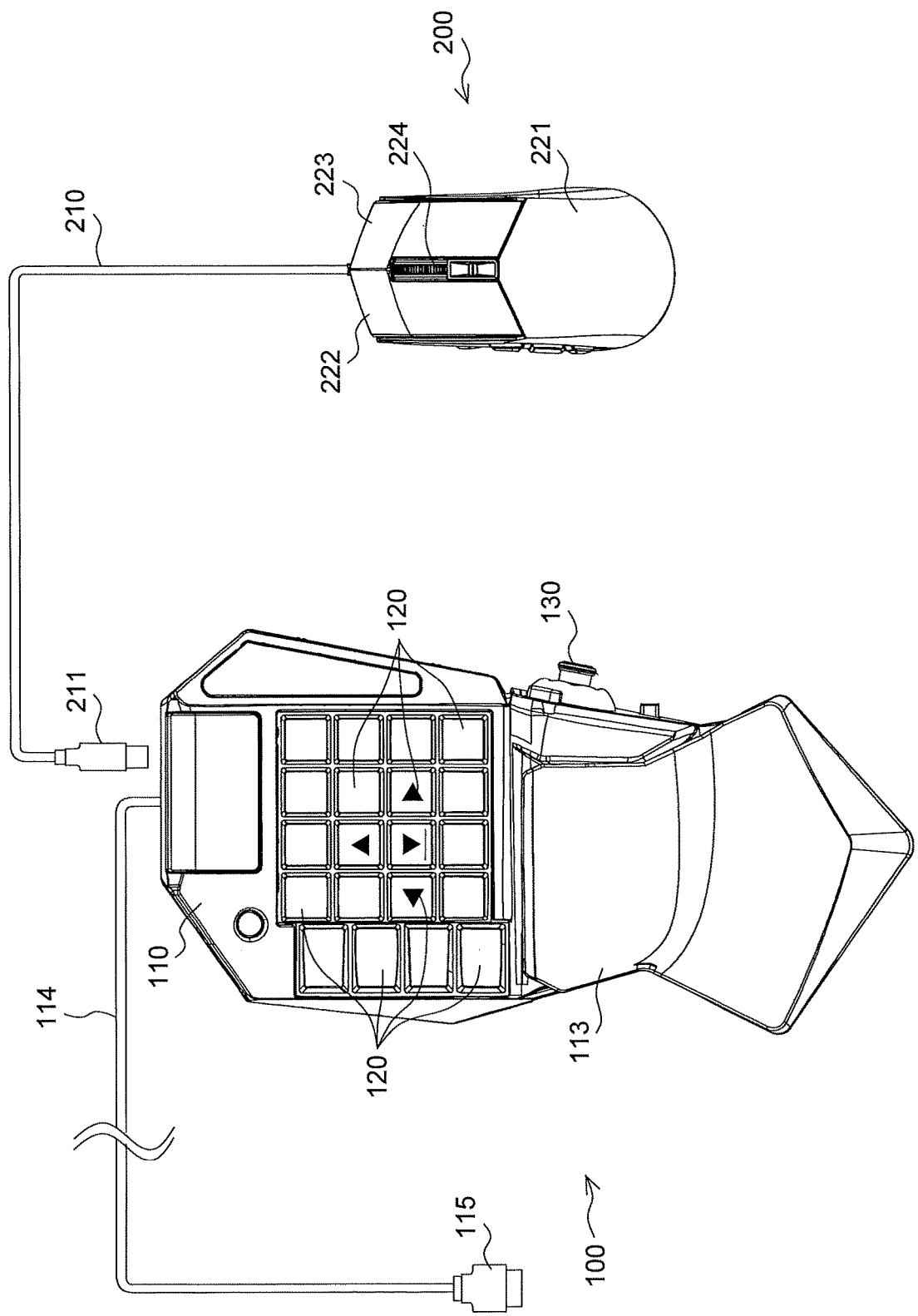
FIG. 1 is a plan view of a controller system for game consoles constituted by combining a game console controller and a mouse according to an embodiment.
Figure 2:
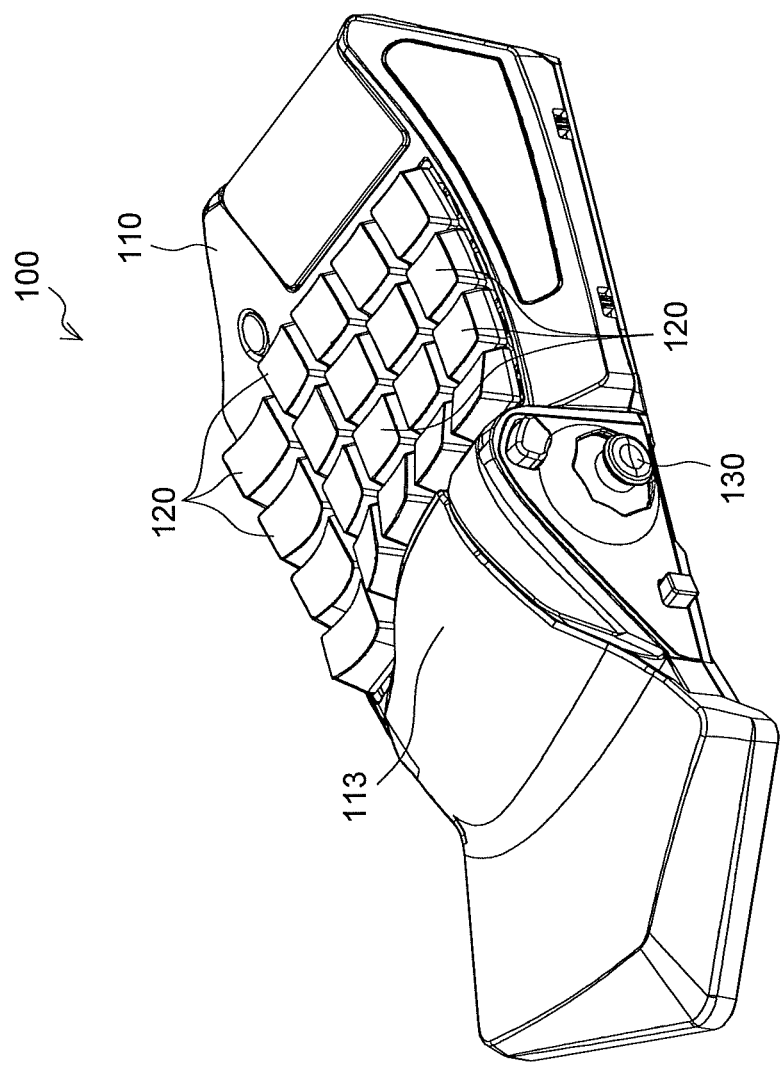
FIG. 2 is a perspective view of the game console controller included in the controller system for game consoles shown in FIG. 1.
Figure 3:
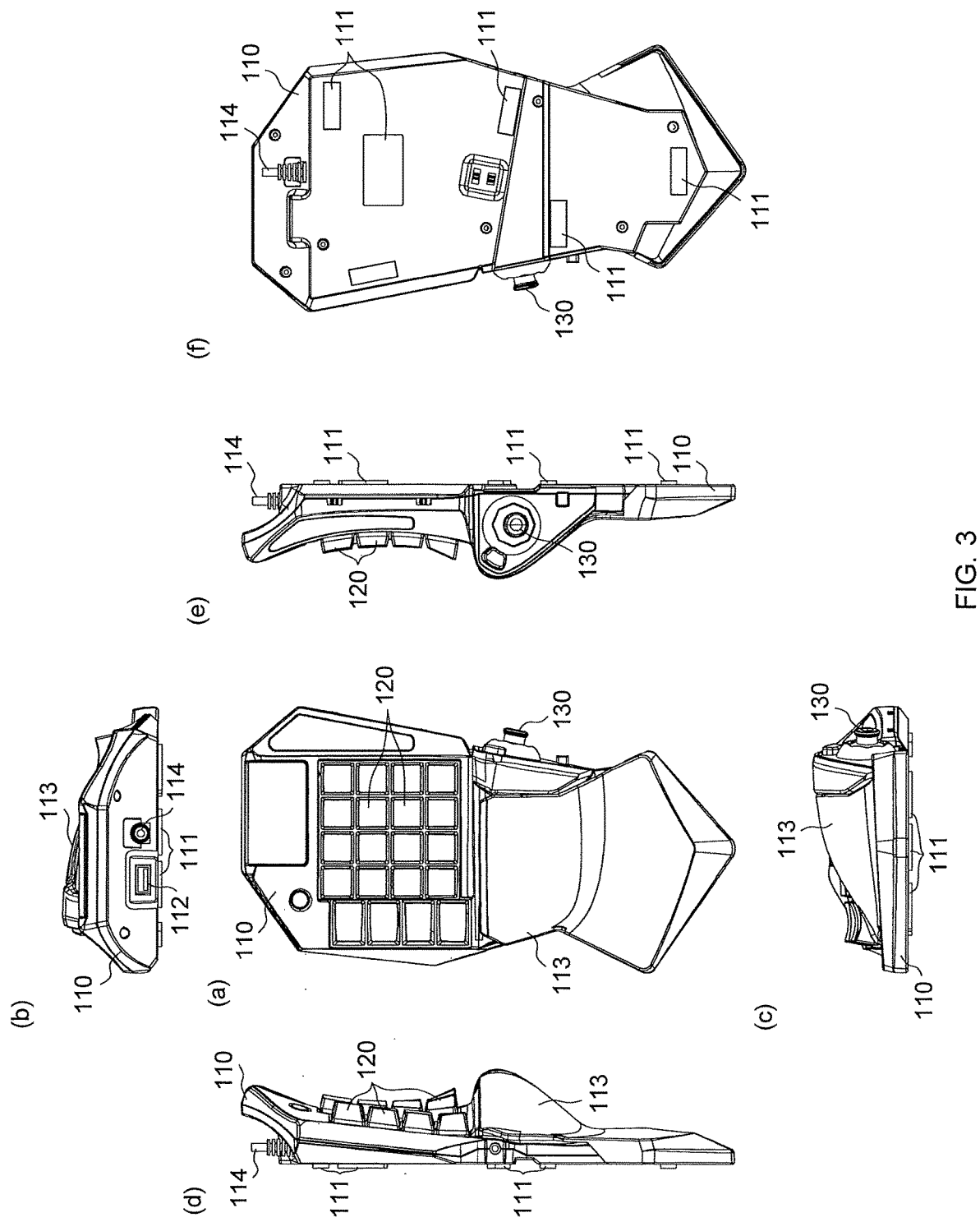
FIG. 3 shows (a) a plan view, (b) a front view, (c) a back view, (d) a left side view, (e) a right side view, and (f) a bottom view of the game console controller included in the controller system for game consoles shown in FIG. 1.
Figure 4:
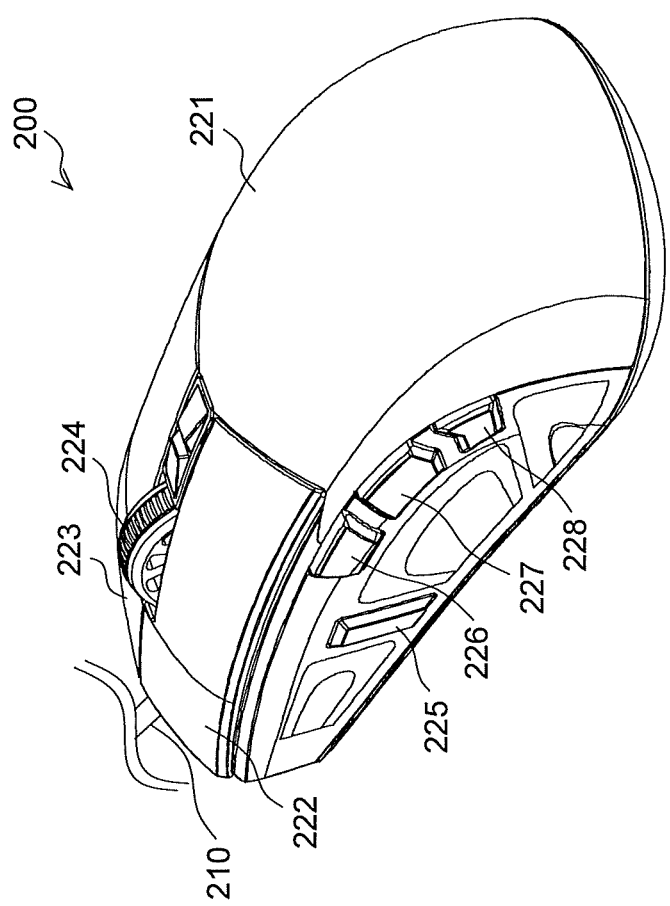
FIG. 4 is a perspective view of the mouse included in the controller system for game consoles shown in FIG. 1.
Figure 5:
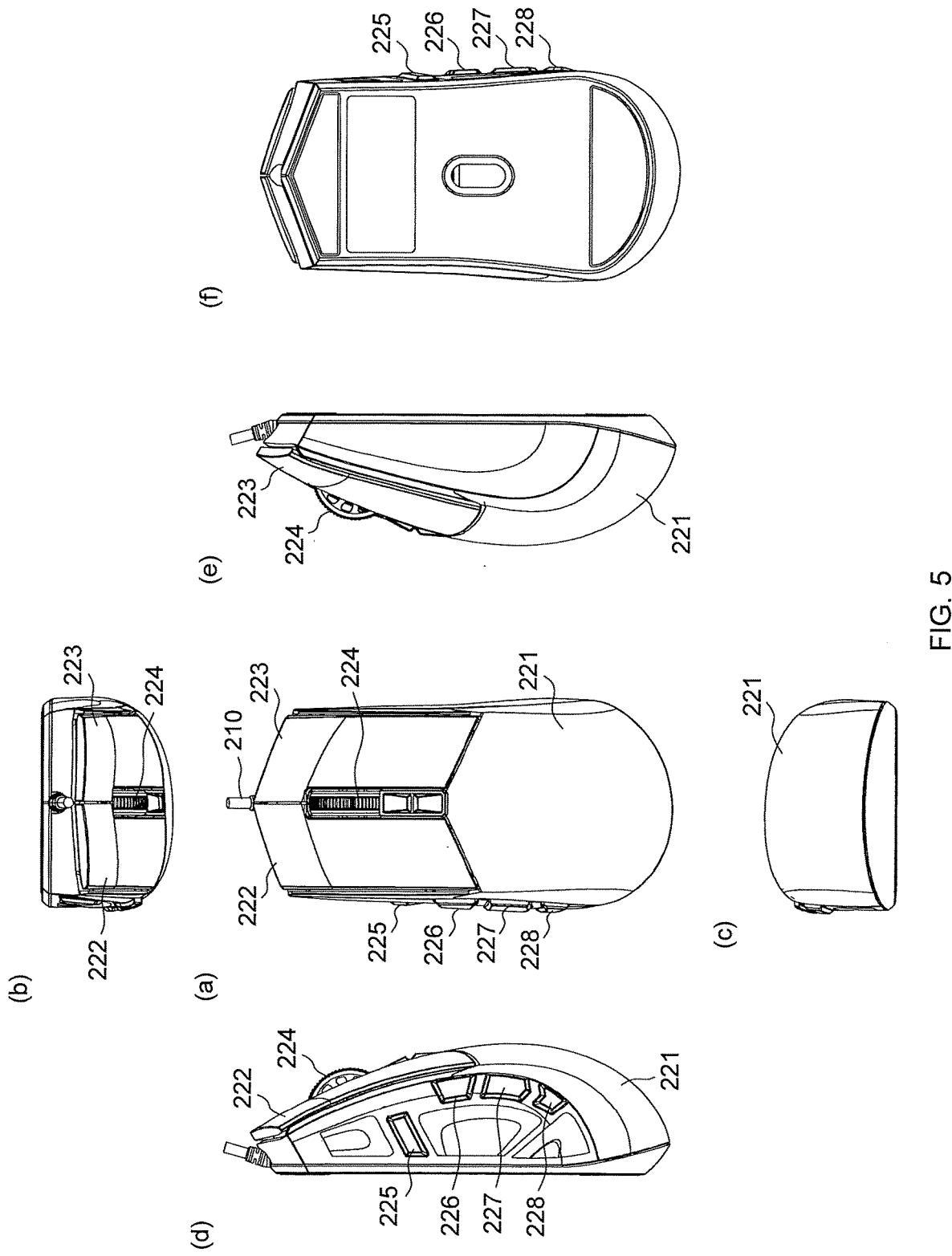
FIG. 5 shows (a) a plan view, (b) a front view, (c) a back view, (d) a left side view, (e) a right side view, and (f) a bottom view of the mouse included in the controller system for game consoles shown in FIG. 1.

FIG. 1 shows a plan view of a controller system for a game console according to the present invention which is constituted by a combination of a controller for the game console and a mouse. FIGS. 2 and 3 show a perspective view and six views, respectively, of a controller for a game console. FIGS. 4 and 5 show a perspective view and six views, respectively, of a mouse.

The controller system for game consoles is used to enter input to game consoles. The game console is a home console for domestic use such as PlayStation 4 (trademark) manufactured and sold by Sony Interactive Entertainment Inc. or Xbox One (trademark) manufactured and sold by Microsoft Japan Co., Ltd. The controller system for game consoles is used in combination with such game consoles, and the controller system in this embodiment is combined with, but not limited to, PlayStation 4.

In use, the controller system for game consoles is placed on a mount surface which is a substantially horizontal surface. The mount surface may be any surface as long as it is substantially horizontal but is typically a top surface such as a top plate of a desk or a table.

As described above, the controller system for game consoles includes a game console controller 100 and a mouse 200. The mouse 200 has a cable 210. In using the controller system for game consoles, the mouse 200 is connected to the game console controller 100 via the cable 210 as described later.

Then, users enter input to the game console controller 100 in a similar manner that they enter input to an official controller by manipulating the game console controller 100 with one hand and the mouse 200 with the other hand. In this embodiment, a user manipulates the game console controller 100 and the mouse 200 with, but not necessarily limited to, his or her left and right hands, respectively.

First, the mouse 200 is described.

The mouse 200 in this embodiment may be a commercially available ordinary mouse that the user has chosen according to his or her preference. The mouse 200 may be an accessory of the game console controller 100 sold alongside the game console controller 100.

The only requirements for the mouse 200 in this embodiment are: it is configured to be capable of generating point data indicating the amount and direction of movement of the mouse 200 when it is moved on the mount surface; it has the cable 210 for transmitting the point data generated; and the cable 210 has, at its one end, a standardized output terminal 211 to be connected to an input terminal described later on the game console controller 100 that receives the point data.

A way of generating point data is publicly or widely known, and a publicly- or widely-known appropriate technique can be applied thereto. For example, the mouse 200 may be an optical mouse or a laser mouse.

Furthermore, the mouse 200 has the standardized output terminal 211 as described above. With this, the mouse 200 can be connected to an input terminal described later which uses the same standard as the output terminal. The standard in this case is, for example, the USB standard. The USB standard includes Type A, Type B, Type C, Mini A, Mini B, Micro A, Micro B, etc. The output terminal 211 in this embodiment has, but not limited to, a USB standard Type A configuration. In fact, various kinds of such mice are commercially available.

As described above, the mouse 200 is required to be able to generate point data but can be configured such that users can enter other data as in the case of publicly- or widely-known mice. The mouse 200 in this embodiment has, but not limited to, a left button 222 and a right button 223 for so-called left-click and right-click, respectively, at positions near an end of a mouse housing 221 attached to a mouse main body 220, and a wheel 224 that allows users to input their responses by rolling it. The mouse 200 is also equipped with, on its left side, but not limited to, four push buttons 225 to 228 at positions where it is easier for users to manipulate the push buttons 225 to 228 with their thumb when they use the mouse with their right hand. The left button 222, the right button 223, the wheel 224, and four push buttons 225 to 228 may or may not be assigned with appropriate inputs. When the left button 222, the right button 223, the wheel 224, and the four push buttons 225 to 228 are assigned with certain inputs, the data generated as a result of their activations can also be outputted from the output terminal 211 via the cable 210.

Next, the game console controller 100 is described.

The game console controller 100 includes a base 110 which corresponds to the main body of the present invention. The base 110 is configured so as to be stably placed on the mount surface. The base 110 has a substantially rectangular shape with its longer sides aligned along the front-to-back direction when viewed in plan, and has a substantially plate-like shape when viewed as a whole. The base 110 has anti-slip pieces 111 made of a resilient material (e.g., rubber) on the bottom surface thereof. With them, the base 110 hardly slip on the mount surface when the base 110 is placed thereon and rest stably on the mount surface.

The controller 100 has an input terminal 112 on the front side thereof. The input terminal 112 can be connected to the output terminal 211 of the mouse 200 described above, and is capable of receiving, when connected to the output terminal 211, the aforementioned point data from the output terminal 211 (and, when appropriate, data generated by the left button 222, the right button 223, the wheel 224, and the four push buttons 225 to 228). The input terminal 112 is a standardized terminal. This increases the chance for the input terminal 112 to be connected to output terminals 211 of many kinds of mice 200. An example of the standard used for the input terminal 112 is, but not limited to, the USB standard. The USB standard includes Type A, Type B, Type C, Mini A, Mini B, Micro A, Micro B, etc. The input terminal 112 in this embodiment has, but not limited to, a USB standard Type A configuration. It should be noted that providing two or more input terminals 112 for different standards can increase the number of mice 200 that can be connected to the game console controller 100, allowing the users to have a wider choice of the mice 200.

In a predetermined area on a front side of the top surface of the base 110, twenty keys 120 are arranged in a 4-by-5 array (with 4 rows and 5 columns). Each of the keys 120 is for accepting inputs by user's pressing it against the base 110. The keys 120 can be configured in the same manner as the keys of publicly- or widely-known keyboards except for their number and layout and, in this embodiment, are configured so. For example, as a way of entering input through the keys 120, any one of publicly- or widely-known approaches can be used such as those used in membrane keyboards, scissor-switch keyboards, and mechanical keyboards.

The keys 120 are arranged in an area where the user can manipulate the keys with a hand, more specifically, the left finger(s) in this embodiment, without displacing the entire left hand. As long as this requirement is met, the number of the keys 120 may be larger or smaller. As will be described later, the keys 120 are often assigned with four inputs corresponding to the up, down, left, and right directions of a four-button directional pad of an official controller of a game console. Accordingly, at least four keys 120 are required. The keys of the keys 120 expected to be assigned by most users with the up, down, left, and right inputs are labeled with black arrow heads each having a shape of an equilateral triangle so that users can visually recognize that the keys 120 are assigned with the inputs of the four directions (up, down, left, and right) (the arrowheads are shown only in FIG. 1). These arrow heads are, for example, embossed in relief or printed on the top of each key 120. In FIG. 1, the keys 120 from the second key from the left to the second key from the right in the third row from the top are labeled with arrowheads pointing the left, down, and right directions. This means that these three keys 120 are expected to be assigned with the left, down and right inputs. The key 120 that is located immediately above the key 120 expected to be assigned with the down input in FIG. 1 is labeled with an arrow head pointing up. This means that this key 120 is expected to be assigned with the up input.

The keys 120 may be six keys 120 (arranged in a 2-by-3 array), i.e., the three keys 120 expected to be assigned with the left, down, and up inputs in the third row in FIG. 1 and the three keys 120 in the second row immediately above.

It is possible that a raised element that marks the home position may be provided on the top surface of any one of the keys 120 such as the key 120 assigned with the down input.

The game console controller 100 has a palm rest 113 with an upwardly convex contour which locates closer to the user who is using the game console controller 100 (i.e., the lower side in FIG. 1) than the keys 120, which are provided on the base 110.

The palm rest 113 is for allowing users to rest their palm thereon in a stable manner. Users can, with their left palm placed on the palm rest 113, manipulate the keys 120 with their four fingers other than the thumb and manipulate an analog stick described later with their left thumb. In this embodiment, the palm rest 113 has, but not limited to, the entirely upward convex shape as well as the inner side (right side in FIG. 1) that is higher than the outer side. This makes it easier for users to manipulate the analog stick described later with their left thumb and ensures a space to displace the analog stick.

To the base 110, an analog stick 130 is attached. The analog stick 130 has, but not limited to, for example, a rod shape, and includes an umbrella-like member at the end thereof for stabilizing the user's manipulation with the thumb. The analog stick 130 is for entering analog input using the direction and magnitude of the displacement.

The analog stick 130 is, but not limited to, located inward at a position closer to the user than the keys 120 in this embodiment. The analog stick 130 in this embodiment protrudes substantially horizontally from the inside of the aforementioned palm rest 113. With the analog stick 130 disposed at this position, users can manipulate the analog stick 130 with their left thumb contacted with the tip of the analog stick without putting too great a load on their thumb, while placing their left palm on the palm rest 113.

Figure 6:
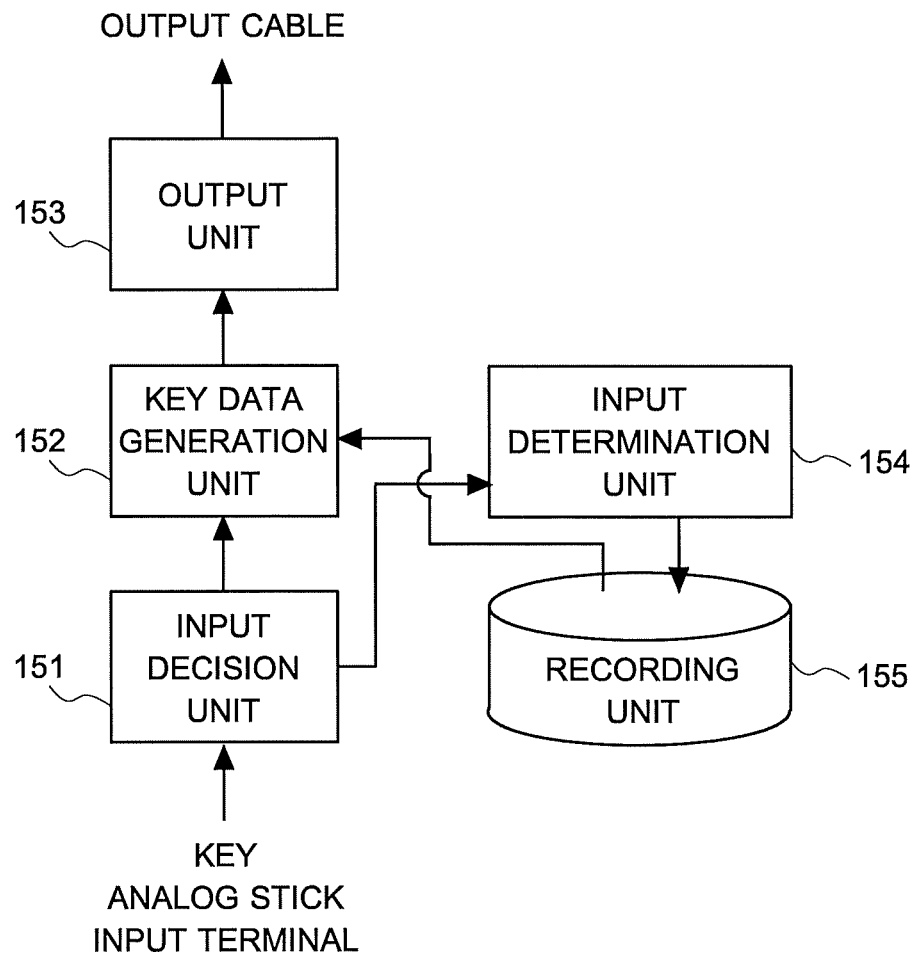
FIG. 6 is a block diagram illustrating functions configured in a circuit board in the game console controller included in the controller system for game consoles shown in FIG. 1.

Inside the base 110, a built-in circuit board which is not shown is provided. The circuit board is publicly- or widely-known substrates on which publicly- or widely-known electronic components are mounted using a publicly- or widely-known method and forms a functional block as shown in FIG. 6.

The block is made up of an input decision unit 151, a key data generation unit 152, an output unit 153, an input determination unit 154, and a recording unit 155.

The input decision unit 151 is for determining, when the key(s) 120 or the analog stick 130 is/are activated, whether the input is data representing an input to be transmitted to the game console or data for determining which input is to be assigned to which key 120. The input decision unit 151 is configured to transmit, when the input from the key(s) 120 or the analog stick 130 is the data representing an input to be transmitted to the game console, the data to the key data generation unit 152, and transmit, when the input is the data for determining which input is to be assigned to which key 120, the data to the input determination unit 154.

More specifically, for example, in this embodiment, when a user holds the analog stick 130 at a downwardly displaced position for 5 seconds or more, the game console controller 100 proceeds to an input setting mode unless the analog stick 130 is further held at the downwardly displaced position for 5 seconds or more. The input decision unit 151 is configured to transmit the data entered through the analog stick 130 or the key(s) 120 at any time from the beginning to the end of the input setting mode to the input determination unit 154 as the data for determining which input is to be assigned to which key 120. The input decision unit 151 is also configured to transmit, when the game console controller 100 is not in the input setting mode, the input from the analog stick 130 or the key(s) 120 to the key data generation unit 152 as the data representing the input to be transmitted to the game console.

Furthermore, the input decision unit 151 is also connected to the input terminal 112 and is configured to receive, from the input terminal 112, the data that the input terminal 112 has received from the mouse 200. The input decision unit 151 is configured to transmit the data received from the mouse 200 to the input determination unit 154 when the game console controller is in the input setting mode and transmit it to the key data generation unit 152 when the game console controller is not in the input setting mode.

The input determination unit 154 is for determining which input is to be assigned to which one of the keys 120, the analog stick 130, and the mouse 200 (i.e., which input corresponding to which input that can be entered using an official controller for game consoles is to be assigned to which device or devices). Any method can be used for the determination but, for example, when the game console controller 100 is in the input setting mode, to the key(s) 120 with which input is entered after the user manipulates certain key(s) 120 (e.g., pressing two or more keys 120 in a certain order) in order to identify a certain input of an official controller for game consoles, the certain input of the official controller specified as a result of the activation of the aforementioned certain key(s) 120 can be assigned. For example, the official controller for PlayStation 4 is equipped with, on the right side thereof, four push buttons labeled with circle, cross, triangle, and square symbols. Then, for example, it is assumed that the input from the button labeled with the circle symbol is identified by pressing, among many keys 120, the left three keys 120 on the first row one by one from the left. The input determination unit 154 is configured to determine that, in such cases, when the key 120 located to the upper left of the key 120 labeled with an upward arrow is pressed immediately after the input is entered by pressing the aforementioned three keys 120 one by one to identify the input from the button assigned with the circle symbol, the input from the key 120 which is made when the game console controller 100 is not in the input setting mode is considered (dealt with) as the input from the push button labeled with the circle symbol of the official controller for game consoles. The input determination unit 154 is configured to record, on the recording unit 155, the data representing which one of the inputs that can be entered from the official controller is assigned to each key.

The input determination unit 154 may, if the user desires to do so, assign certain inputs that can be entered from the official controller for game consoles to the left and right buttons 222 and 223, the wheel 224, and four push buttons 225 to 228 of the mouse 200. When the game console controller 100 is in the input setting mode, certain inputs are assigned to the left and right buttons 222 and 223, the wheel 224, and four push buttons 225 to 228 of the mouse 200 according to the data transmitted from the mouse via the input decision unit 151 from the input terminal 112. More specifically, for example, the input determination unit 154 is configured to, if the push button 225 of the mouse 200 is pressed immediately after the input entered by pressing the aforementioned three keys 120 one by one to identify the input from the push button labeled with the circle symbol of the official controller, consider (deal with) the input from the push button 225 of the mouse 200 as the input from the push button labeled with the circle symbol of the official controller for game consoles.

As described above, the data indicating which one of the inputs that can be entered from the official controller is assigned to each key 120 is recorded on the recording unit 155. These data are updated every time when the assignment is changed. Among the data, the latest one is supplied to the key data generation unit 152.

The key data generation unit 152 is configured to receive, when the game console controller 100 is not in the input setting mode, inputs from the keys 120, the analog stick 130, or the left button 222, the right button 223, the wheel 224, and the four push buttons 225 to 228 of the mouse 200.

The key data generation unit 152 is for identifying, when the key(s) 120 and others are activated, from which one of the keys 120 and others each input is made and generating key data which is the data about the output assigned to the key (s) 120 and others activated, based on the data recorded on the recording unit 115 and received from the recording unit 155. The key data generation unit 152 may be configured to read the data recorded on the recording unit 155 from the recording unit 155 every time when the data on the recording unit 155 is updated, or may be configured to read the latest data from the recording unit 155 every time an input is received from one of the key(s) 120 and others. The same applies to cases where an input is made from an interface other than the keys 120. The key data generation unit 152 is configured to generate key data which is the data about the output assigned to the left button 222 or others activated, in response to an input from the mouse, i.e., from one of the left button 222, the right button 223, the wheel 224, and the four push buttons 225 to 228.

Furthermore, the key data generation unit 152 of this embodiment is configured to generate, when the analog stick 130 is activated, analog data indicating the displacement direction and angle of it. The output unit 153 has functions to receive the key data and the analog data from the key data generation unit 152, receive the point data from the input terminal 112, and output the key data, analog data, and point data.

On the front side of the base 110, an output cable 114 is provided. The output unit 153 is configured to transmit the point data, the key data, and the analog data to the game console via the output cable 114. A connection terminal 115 is provided at an end of the output cable 114 to allow the output cable 114 to be connected to the game console via the connection terminal 115. The connection terminal 115 is designed to be connected to a terminal on the game console for the terminal on the game console.

In this embodiment, the output unit 153 is configured to wire the point data, the analog data, and the key data to the game console via the output cable 114 but the output unit 153 may be configured to transmit the point data, the analog data, and the key data to the game console wirelessly by media such as radio waves and light.

Next, how to use the controller system for game consoles described above and operations thereof are described.

In using the controller system for game consoles, the user places the game console controller 100 and the mouse 200 on the mount surface (whichever may come first). Then, the user first connects the game console controller 100 and the mouse 200 via the cable 210 and connects the game console controller 100 and the game console via the output cable 114.

The game console controller 100 and the mouse 200 are connected to each other by plugging the output terminal 211 at the end of the cable 210 of the mouse 200 into the input terminal 112 of the game console controller 100. The game console controller 100 and the game console are connected to each other by plugging the connection terminal 115 at the end of the output cable 114 into a connection terminal (not shown) of the game console.

Next, the user shifts the game console controller 100 to the input setting mode in order to determine to which one of the inputs from the official controller for the game console each of the inputs from the keys 120 of the game console controller 100, the input from the analog stick 130, and the input about the movement of the mouse 200 corresponds. As described above, in the input setting mode, an input may be assigned to, if necessary, each of the left button 222, the right button 223, the wheel 224, and the four push buttons 225 to 228 of the mouse 200. The user can shift the game console controller 100 to the input setting mode by means of, but not limited to, pressing and holding the analog stick 130 of the game console controller for 5 seconds or more in this embodiment.

As described above, commercially available game consoles are equipped with a four-button directional pad and an analog stick located on the left half, and four push buttons and an analog stick located on the right half. The user can assign inputs from these devices for entering input to respective inputs from the keys 120 and others of the game console controller 100 according to his or her preference.

For example, the user can assign the up, down, left, and right inputs entered through the four-button directional pad of an official controller to the keys 120 of the game console controller 100 which are labeled with upward, downward, leftward, and rightward arrow heads, respectively. As a result, when the user presses these keys 120 labeled with the upward, downward, leftward, and rightward arrow heads with the game console controller 100 not in the input setting mode, the data that are same to those produced when the four-button directional pad of the official controller is pressed in the upward, downward, leftward, and rightward directions are sent to the game console. The same applies to below.

The user assigns the input entered through the right analog stick of the two analog sticks of the official controller to the movement of the mouse 200.

Furthermore, the user assigns the input entered through the left analog stick of the two analog sticks of the official controller to the analog stick 130 of the game console controller 100.

The user also assigns each of the inputs entered through the four push buttons of the official controller to each of the left button 222, the right button 223, the wheel 224, and the four push buttons 225 to 228 of the mouse 200, or to each of the keys 120 that have not yet been assigned with anything, other than the four keys 120 labeled with the arrow heads.

The official controller of the game console has additional six buttons that allow users to enter certain input by pressing them, such as L1, L2, L3, R1, R2, and R3 buttons of a controller for PlayStation 4. The user can assign inputs associated with these buttons to the left button 222, the right button 223, the wheel 224, and the four push buttons 225 to 228 of the mouse 200 or the keys 120 of the game console controller 100 which have not yet been assigned with anything. Furthermore, the user can assign an input that occurs when two or more operations of the input device of the official controller are done, to one of the keys 120 and others which have not yet been assigned with anything. With this, it is possible to allow users to send, merely by operating one of the keys 120 and others of the game console controller 100, to the game console, the data that are identical to simultaneous pressing of, for example, one of the four push buttons and the up input of the four-button directional pad of the official controller used when the user controls the official controller. This makes it possible to achieve, by a simple operation of, for example, pressing one of the keys 120 of the game console controller, a complicated input that can be achieved only after two or more operations are performed using the official controller of the game console.

It should be noted that, among the assignments described above, assignment of the input associated with the left analog stick of the two analog sticks of the official controller to the analog stick 130 of the game console controller 100 is more likely to be accepted by many users. Accordingly, this can be recorded previously, as a default setting, on the recording unit 155 of the game console controller at the time of shipment.

In any case, the data indicating which input that can be entered from the official controller is assigned to which one of the keys 120 and others is recorded on the recording unit 155 by the input determination unit 154.

The user again presses and holds the analog stick 130 at a downwardly displaced position for 5 seconds or more to terminate the input setting mode.

After the user have completed the input setting mode in a manner as described above, he or she can play a game using the controller system for game consoles.

The user manipulates, while resting his or her left palm on the palm rest 113 of the game console controller 100, the key(s) 120 with the finger(s) other than the thumb and manipulates the analog stick 130 with the thumb. In addition, the user holds the mouse 200 with the right hand to move the mouse 200 and manipulates the left button 222, the right button 223, and the four push buttons 225 to 228 of the mouse 200 when appropriate. Users who are familiar with gaming on a general-purpose personal computer are not stressed by these manipulations.

When the user manipulates the key(s) 120, key data is generated in the key data generation unit 152. When the user manipulates the left button 222, the right button 223, the wheel 224, and the four push buttons 225 to 228 of the mouse 200, data corresponding to the respective devices are generated by the mouse 200 and sent to the game console controller 100 via the cable 210. These data are sent to the key data generation unit 152, and the key data generation unit 152 generates key data depending on the received data. When the user manipulates the analog stick 130, analog data is generated. The key data and the analog data are transmitted from the key data generation unit 152 to the output unit 153.

On the other hand, when the user moves the mouse 200, point data is generated by the mouse 200 and is sent to the game console controller 100 via the cable 210. Although the point data need not to be necessarily sent to the key data generation unit 152, the point data in this embodiment is sent to the key data generation unit 152 and, in turn, to the output unit 153 without being processed in the key data generation unit 152.

The output unit 153 in the game console controller 100 transmits the received key data, analog data, and point data to the game console via the output cable 114.

In this way, the game is performed.

Once the game is over, the user releases the connection between the game console controller 100 and the mouse 200 as well as the connection between the game console controller 100 and the game console.

It is, of course, possible to change the aforementioned assignments to the key(s) 120 and others when, for example, the user want to play another game.

The mouse 200 and the game console controller 100 in this embodiment are connected to each other using a wired connection via the cable 114.

Alternatively, the game console controller 100 and the mouse 200 may be connected to each other wirelessly by media such as radio waves and light and the point data generated by the mouse 200 and the data generated upon activation of the left button 222, the right button 223, and the four push buttons 225 to 228 of the mouse 200 may be transmitted from the mouse 200 to the game console controller 100 wirelessly.

However, even in this case, the communication between the game console controller 100 and the mouse 200 should be achieved in a standardized manner as in the case that the aforementioned output terminal 211 and the input terminal 112 are both standardized. Examples of the standardized communication include the Bluetooth™ communication technology or the technology for the wireless USB protocol.

The invention claimed is:

1. A game console controller for use with a computer mouse capable of generating point data indicating an amount and direction of movement of the mouse by way of a user and including a mouse output interface configured to transmit the point data to the game console controller, the game console controller comprising:
- a main body having a top surface and a bottom surface, the bottom surface capable of being stably supported on a substantially flat mount surface, the main body including a control unit having an input communication interface configured to receive data and an output communication interface configured to transmit data to a remote game console;
- a plurality of keys arranged on the top surface of the main body and configured to be actuable by the user to thereby generate key data when each of the keys are pressed, the keys being arranged in an area of the top surface of the main body where the user can actuate the keys;
- wherein the input communication interface of the control unit of the main body of the game console controller is configured to receive the generated point data from the mouse output interface;
- wherein the output communication interface of the control unit of the game console controller is configured to transmit the key data and the point data to the remote game console; and
- wherein the input communication interface of the control unit of the main body of the game console controller is a standardized input interface whereby the game console controller is capable of communicating with a plurality of different computer mice having a standardized mouse output interface.

2. The game console controller of claim 1, wherein the input communication interface of the control unit supports a wireless standard.

3. The game console controller of claim 1, wherein the input communication interface of the control unit includes an input terminal configured to releasably secure to an output terminal of a cable extending from the computer mouse to receive the generated point data from the mouse.

4. The game console controller of claim 3, wherein the input communication interface of the control unit supports the USB standard.

5. The game console controller of claim 1, wherein the plurality of keys includes three keys that are aligned in a row across a width of the main body of the game console controller and a forth key disposed on one side of the row of three keys.

6. The game console controller of claim 5, wherein the plurality of keys are programmable and each of the four keys are programmed to generate key data representing one of an up, a down, a left, and a right direction.

7. The game console controller of claim 1, further including an analog stick arranged with the main body and configured to be actuable by the user to thereby generate analog data according to a direction in which the analog stick is inclined.

8. The game console controller of claim 7, wherein the analog stick is arranged on a side surface of the main body of the game console controller.

9. The game console controller of claim 1, further including a palm rest arranged with the main body onto which a palm of the user can rest and located in a position such that a plurality of fingers of the user can actuate the plurality of keys to generate the key data.

10. The game console controller of claim 9, wherein the palm rest is configured in an upwardly extending convex shape.

11. The game console controller of claim 9, further including an analog stick arranged with the main body and configured to be actuable by the user to thereby generate analog data according to a direction in which the analog stick is inclined.

12. The game console controller of claim 11, wherein the analog stick is arranged on a side surface of the main body of the game console controller and located in a position such that a thumb of the user can actuate the analog to generate the analog data.

13. A game console controller for use with a computer mouse having a standardized mouse output interface configured to transmit point data generated by movement of the mouse by a user, the game console controller comprising:
- a main body including a control unit having a standardized input communication interface configured to receive the point data from the standardized mouse output interface and an output communication interface configured to transmit data to a remote game console;
- a plurality of keys arranged on the main body and configured to be actuable by the user to thereby generate key data when each of the keys are pressed;
- wherein the output communication interface of the control unit of the game console controller is configured to transmit the key data and the point data to the remote game console; and
- wherein the game console controller is capable of communicating with a plurality of different computer mice having standardized mouse output interfaces by way of the standardized input communication interface of the control unit of the game console controller.

14. The game console controller of claim 13, wherein the standardized input communication interface of the control unit supports a wireless standard.

15. The game console controller of claim 13, wherein the standardized input communication interface of the control unit includes an input terminal configured to releasably secure to an output terminal of a cable extending from the computer mouse to receive the generated point data from the mouse.

16. The game console controller of claim 15, wherein the standardized input communication interface of the control unit supports the USB standard.

17. The game console controller of claim 13, further including an analog stick arranged with the main body and configured to be actuable by the user to thereby generate analog data according to a direction in which the analog stick is inclined.

18. The game console controller of claim 17, wherein the analog stick is arranged on a side surface of the main body of the game console controller.

19. The game console controller of claim 13, further including a palm rest arranged with the main body onto which a palm of the user can rest and located in a position such that a plurality of fingers of the user can actuate the plurality of keys to generate the key data.

20. The game console controller of claim 19, further including an analog stick arranged with the main body and configured to be actuable by the user to thereby generate analog data according to a direction in which the analog stick is inclined.

21. A combination of a game console controller and a computer mouse, the combination comprising:
- a computer mouse capable of generating point data indicating an amount and direction of movement of the mouse by way of a user, the computer mouse including a standardized mouse output interface configured to transmit the point data;

a game console controller comprising:
- a main body including a control unit having a standardized input communication interface configured to receive the point data from the standardized mouse output interface and an output communication interface configured to transmit data to a remote game console;
- a plurality of keys arranged on the main body and configured to be actuable by the user to thereby generate key data when each of the keys are pressed;

wherein the output communication interface of the control unit of the game console controller is configured to transmit the key data and the point data to the remote game console; and wherein the game console controller is capable of communicating with the computer mouse by way of the standardized input communication interface of the control unit of the game console controller.

\* \* \* \* \*